United States Patent
Lin et al.

(10) Patent No.: US 7,206,036 B2
(45) Date of Patent: Apr. 17, 2007

(54) SCREWLESS FIXING STRUCTURE FOR FLAT DISPLAY

(75) Inventors: Smile Lin, Tucheng (TW); Chi-Jung Wu, Taoyuan (TW)

(73) Assignee: BenQ Corporation, Taoyuan (TW)

( * ) Notice: Subject to any disclaimer, the term of this patent is extended or adjusted under 35 U.S.C. 154(b) by 0 days.

(21) Appl. No.: 10/279,487

(22) Filed: Oct. 23, 2002

(65) Prior Publication Data
US 2003/0086029 A1    May 8, 2003

(30) Foreign Application Priority Data
Nov. 5, 2001    (TW) ............... 90218925 U

(51) Int. Cl.
*G02F 1/1333*    (2006.01)
*H05K 7/00*    (2006.01)
(52) U.S. Cl. .................... 349/58; 349/59; 361/681
(58) Field of Classification Search ................ 349/58, 349/59, 60; 362/681, 682
See application file for complete search history.

(56) References Cited

U.S. PATENT DOCUMENTS

| | | | | | |
|---|---|---|---|---|---|
| 5,432,626 A | * | 7/1995 | Sasuga et al. | ................ | 349/58 |
| 5,748,270 A | * | 5/1998 | Smith | ........................... | 349/69 |
| 6,147,724 A | * | 11/2000 | Yoshii et al. | ................ | 349/62 |
| 6,181,390 B1 | * | 1/2001 | Wang et al. | .................. | 349/58 |
| 6,195,148 B1 | * | 2/2001 | Sasuga et al. | ............. | 349/149 |
| 6,424,390 B1 | * | 7/2002 | Chen et al. | ................... | 349/58 |
| 6,522,372 B2 | * | 2/2003 | Yang | ........................... | 349/58 |
| 6,542,206 B1 | * | 4/2003 | Saito | ........................... | 349/58 |
| 6,671,012 B1 | * | 12/2003 | Tanaka | ........................ | 349/58 |
| 2001/0026334 A1 | * | 10/2001 | Natsuyama | ................. | 349/58 |

* cited by examiner

*Primary Examiner*—Andrew Schechter
*Assistant Examiner*—Michael H. Caley
(74) *Attorney, Agent, or Firm*—Ladas & Parry LLP

(57) ABSTRACT

The present invention discloses a fixing structure for a flat display, such as an LCD having a liquid crystal panel, in which a first engaging portion is formed on both side surfaces of the flat display. The fixing structure has two holders and a shielding device. Each of the holders has a first fixing portion corresponding to the first engaging portion, and a second engaging portion. The first fixing portion detachably engages the holder to its corresponding side surface. The shielding device is applied onto the back surface of the liquid crystal panel, and is formed with a second fixing portion corresponding to the second engaging portion. The second fixing portion detachably engages the shielding device to the holders.

18 Claims, 5 Drawing Sheets

SCREWLESS FIXING STRUCTURE FOR FLAT DISPLAY

BACKGROUND OF THE INVENTION

1. Field of the Invention

The present invention relates to a panel fixing structure for a flat display such as a liquid crystal display (LCD), and particularly to a screwless fixing structure for fixing the display panel and its holder.

2. Description of the Related Art

In recent years, liquid crystal display (LCD) technology has been widely used in the field of flat displays. The conventional LCD structure is shown in FIG. 1, in which a liquid crystal panel 1 is provided as the display screen, and a large-scale holder 2 is provided on the back surface of the liquid crystal panel 1 for fixing liquid crystal panel 1. A printed circuit board 3 (PCB) is then applied at an opposite side of the holder 2 to the liquid crystal panel 1 for the controlling circuit of the LCD, and a shielding device 4 is further applied on the very back of the LCD for protection of the liquid crystal panel 1 and the PCB 3. In the conventional LCD structure, the holder 2 is fixed to the liquid crystal panel 1 at both side surfaces by several screws 5, as shown in FIG. 1. Further, screws 6 fix the PCB 3, and screws 7 fix the shielding device 4 onto the back of the holder 2.

However, the conventional LCD structure has some drawbacks. First, the holder 2 is fixed to the liquid crystal panel by screwing the screws 5 at the side surfaces of the liquid crystal panel 1 as shown in FIG. 1; however, the liquid crystal panel 1 has a relatively small thickness, which makes it difficult to keep a proper alignment of the screws 5 and the screw holes and to exert screwing force in the screwing process. Thus, when the screws 5 fail to keep a proper alignment with the screw holes, screw-stripping may occur, and the screws or the screwdriver may scrape the liquid crystal panel. Further, when screwing of one side of the liquid crystal panel is completed, a 180-degree rotation of the LCD is required for screwing of the other side, thus increasing the risk of impact to the LCD. Further, additional rotatable fixtures or jigs are also required for the above-mentioned screwing process, which conspicuously increases manufacturing costs and time.

SUMMARY OF THE INVENTION

In view of this, the object of the present invention is to disclose a fixing structure of a flat display, such as an LCD, so that the flat display does not require screwing and rotating in fixing of the liquid crystal panel and the holder. Thus, additional fixtures and jigs are not necessary, and the assembly of the flat display is simplified, which decreases the risk of scraping the liquid crystal panel or impacting the LCD, and the cost and time of the LCD manufacture.

The present invention discloses a fixing structure for a flat display, in which a first engaging portion is formed on both side surfaces of the flat display. The fixing structure comprises: a holder formed with a first fixing portion corresponding to the first engaging portion, and a second engaging portion, the first fixing portion for detachably engaging the holder to the side surface of the flat display; and a shielding device formed with a second fixing portion corresponding to the second engaging portion, the second fixing portion for detachably engaging the shielding device to the holder.

In the aforementioned fixing structure, the first engaging portion can be formed with a plurality of positioning holes, and the first fixing portion can be formed with a plurality of positioning pins corresponding to the positioning holes. Alternatively, the first engaging portion can be formed with a plurality of positioning pins, and the first fixing portion can be formed with a plurality of positioning holes corresponding to the positioning pins.

Further, the second engaging portion can be formed with a plurality of engaging hooks, and the second fixing portion comprises a first surface, a second surface and a plurality of engaging holes passing through the first and second surfaces and corresponding to the engaging hooks, wherein when the holders and the shielding device are fixed together, the engaging hooks pass through the engaging holes from the first surface to protrude out of the second surface. Alternatively, the second engaging portion can be formed with a plurality of engaging holes, and the second fixing portion can be formed with a plurality of engaging hooks corresponding to the engaging holes. Additionally, each holder comprises a first portion and a second portion, the first portion and the second portion form an L-shaped structure, the first portion contacts the side surface of the flat display, and the second portion contacts the back surface of the flat display.

The present invention also discloses a liquid crystal display, comprising a liquid crystal panel having a front surface, a back surface opposed to the front surface, and two opposing side surfaces, each of the side surfaces being respectively formed with a first engaging portion; a holding module having two holders respectively corresponding to each of the side surfaces of the liquid crystal panel, each of the holders being formed with a first fixing portion corresponding to the first engaging portion, and a second engaging portion, the first fixing portion for detachably engaging the holder to the corresponding side surface; and a shielding device applied onto the back surface of the liquid crystal panel, the shielding device being formed with a second fixing portion corresponding to the second engaging portion, the second fixing portion for detachably engaging the shielding device to the holding module.

In the aforementioned liquid crystal panel, the first engaging portion can be formed with a plurality of positioning holes, and the first fixing portion can be formed with a plurality of positioning pins corresponding to the positioning holes. Alternatively, the first engaging portion can be formed with a plurality of positioning pins, and the first fixing portion can be formed with a plurality of positioning holes corresponding to the positioning pins.

Further, the second engaging portion can be formed with a plurality of engaging hooks, and the second fixing portion can be formed with a plurality of engaging holes corresponding to the engaging hooks. Alternatively, the second engaging portion can be formed with a plurality of engaging holes, and the second fixing portion can be formed with a plurality of engaging hooks corresponding to the engaging holes.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
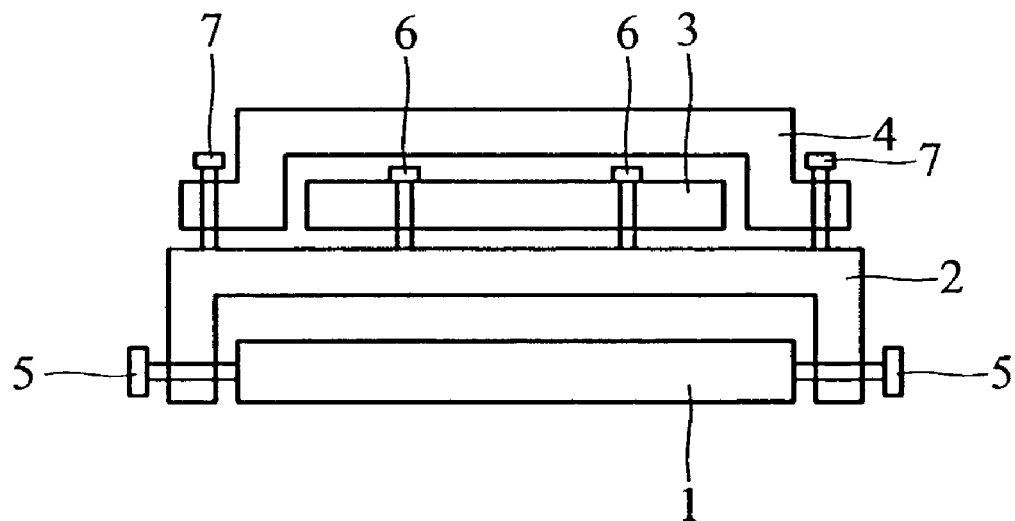
FIG. 1 is a schematic drawing of the conventional LCD structure.
Figure 2:
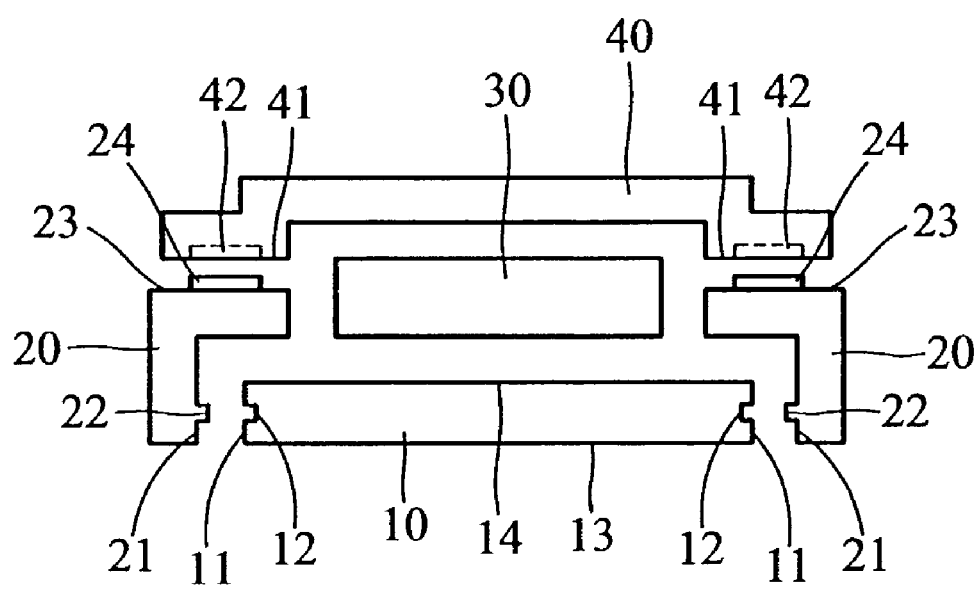
FIG. 2 is a schematic drawing showing the liquid crystal display of an embodiment of the present invention.
Figure 3:
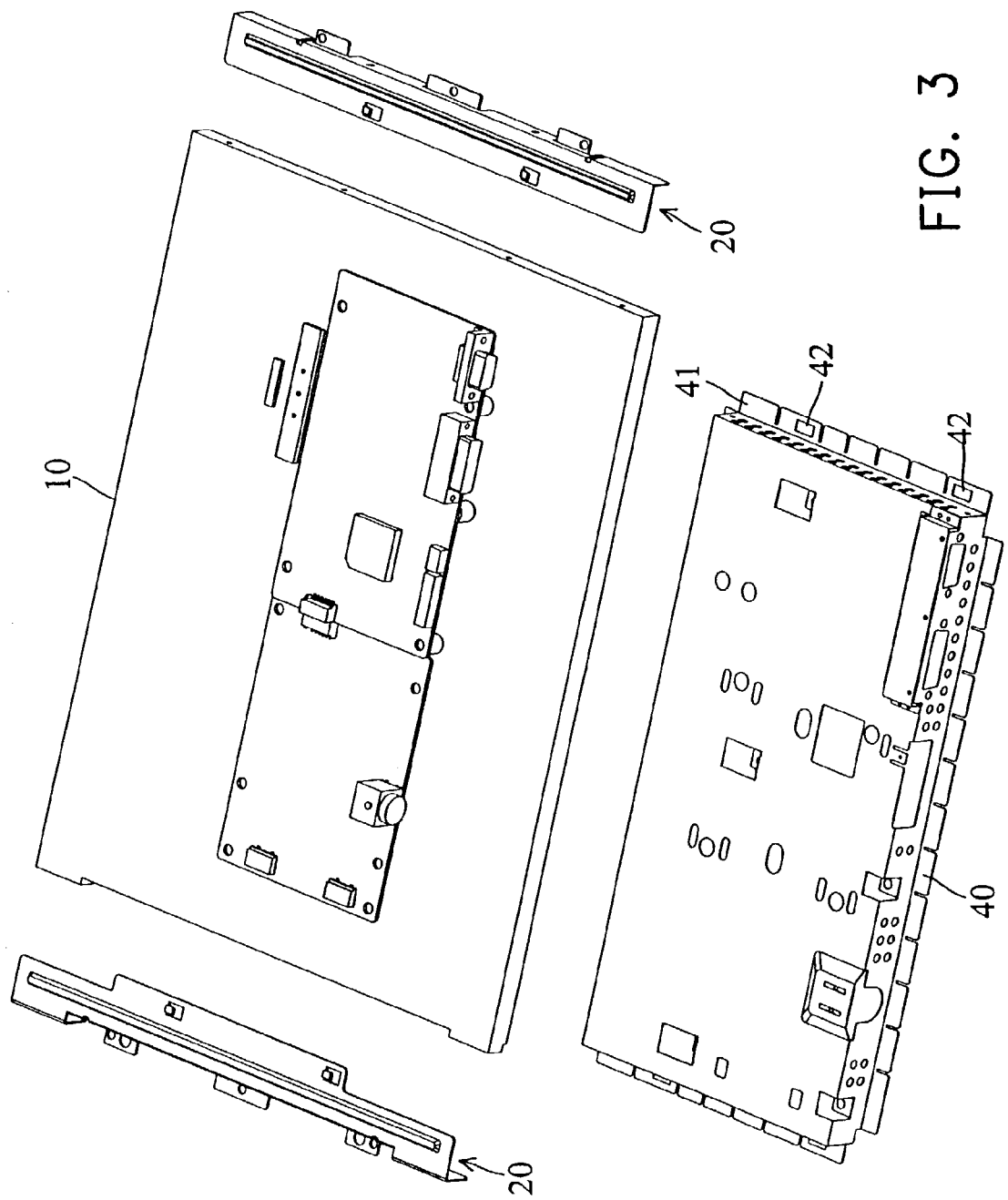
FIG. 3 is a perspective exploded view showing the liquid crystal display of an embodiment of the present invention.

The LCD fixing structure of an embodiment of the present invention will be described hereinafter in detail in reference to FIG. 2 and FIG. 3. FIG. 2 shows a schematic top view of the embodiment, and FIG. 3 shows the perspective exploded view of the embodiment.

The fixing structure of the present invention is used as a fixing structure for a liquid crystal panel 10. In the disclosed embodiment, the liquid crystal panel 10 has a front surface 13, a back surface 14, and two opposing side surfaces 11, with each of the side surfaces acting as a first engaging portion. The first engaging portions (that is, the side surfaces) 11 are formed with a plurality of positioning holes 12 (two on each of the side surfaces 11 in the disclosed embodiment). Further, two separate holders 20 are respectively disposed on each side of the liquid crystal panel 10, with a PCB 30 and a shielding device 40 disposed on the back surface 14.

Figure 4:
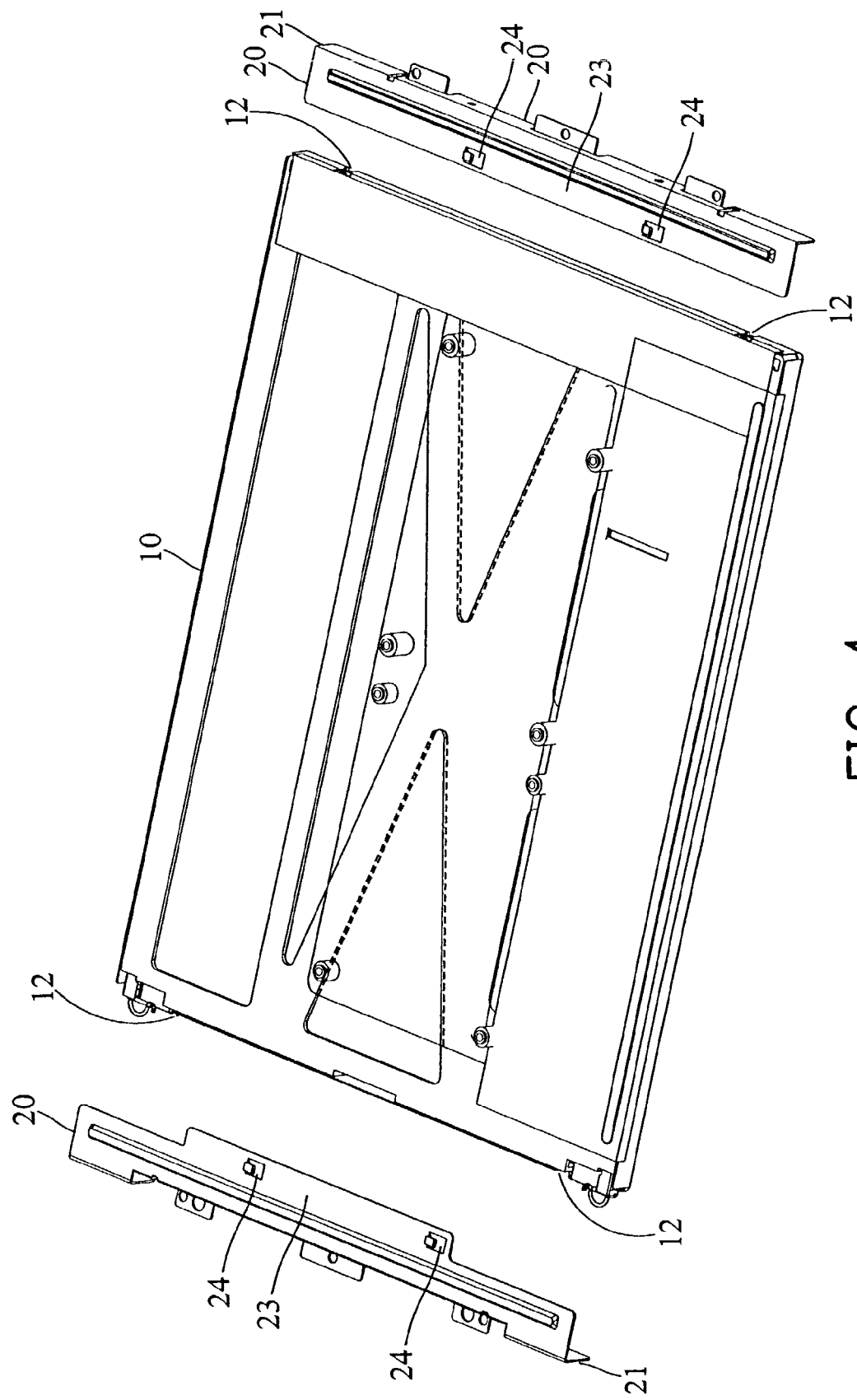
FIG. 4 is a perspective view showing the liquid crystal panel and the holders of the embodiment.
Figure 5:
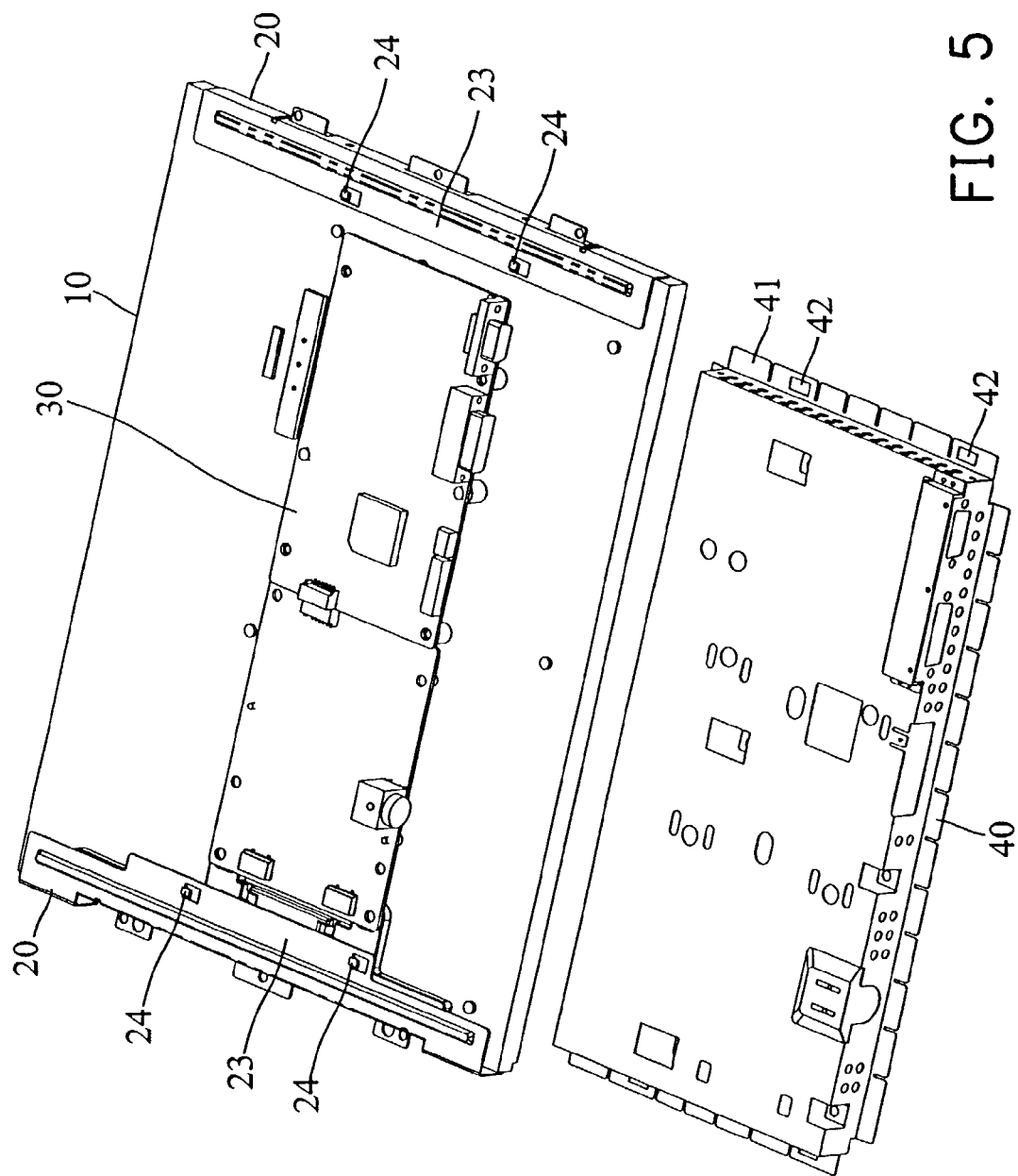
FIG. 5 is a perspective view showing the assembled liquid crystal panel and the holders of the embodiment.

Each of the holders 20 is substantially a L-shaped member, formed with a first fixing portion 21 corresponding to the first engaging portion 11 of the liquid crystal panel 10, and a second engaging portion 23, as shown in FIG. 2. The first fixing portion 21 is formed with a plurality of positioning pins 22 corresponding to the positioning holes 12, so that each of the holders 20 can be detachably engaged to the corresponding side surface 11 of the liquid crystal panel 10 with engagement of the positioning holes 12 and the positioning pins 22. FIG. 4 and FIG. 5 further shows the disassembled and assembled view of the holders 20 and the liquid crystal panel 10.

The engagement of the positioning holes 12 and the positioning pins 22 enables the holders 20 fixed on both sides of the liquid crystal panel 10 without any possible relative rotating motion or any relative movement in directions other than the lateral direction as shown in FIG. 4 or FIG. 5. That is, the holders 20 may possibly move in the lateral direction of the liquid crystal panel 10 with only the engagement of the positioning holes 12 and the positioning pins 22; thus, the engagement of the positioning holes 12 and the positioning pins 22 may part on the possibly lateral movement of the holders 20.

Figure 6:
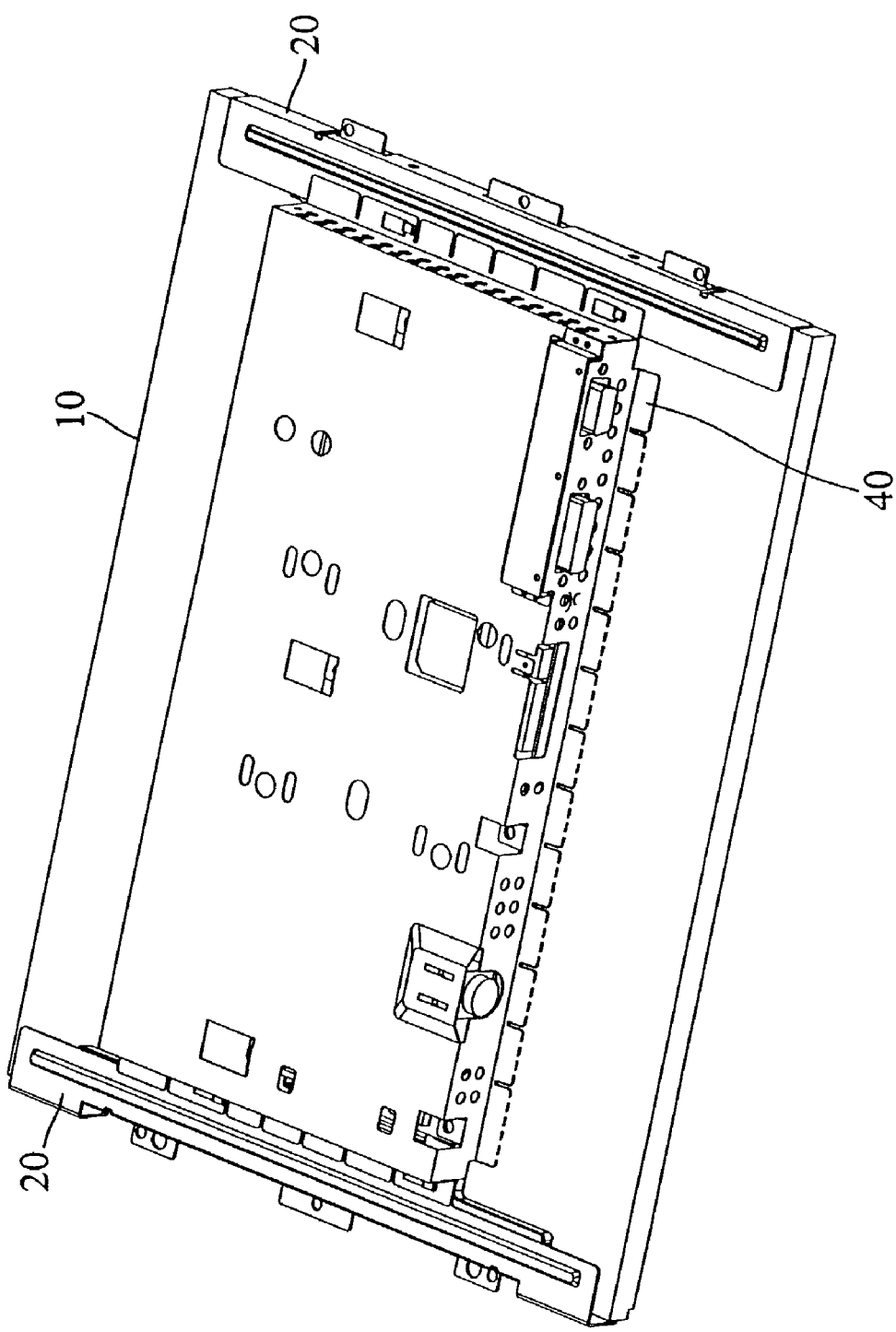
FIG. 6 is a perspective assembled view of the liquid crystal display of the embodiment.

In view of this, a plurality of (two in the disclosed embodiment) engaging hooks 24 is formed on the second engaging portion 23 of each of the holders 20, and a second fixing portion 41 that corresponds to the second engaging portion 23 is provided on the shielding device 40, with a plurality of engaging holes 42 that respectively corresponds to the engaging hooks 24 formed on the second fixing portion 41. By installing the shielding device 40 vertically to the assembly of the liquid crystal panel 10 and the holders 20 as shown in FIG. 5, each of the engaging holes 42 locks a corresponding engaging hook 24, and the shielding device 40 is detachably fixed to the holders 20 so that the holders 20 are restrained from moving laterally. Thus, the engagement of the positioning holes 12 and the positioning pins 22 is firmly held with the application of the shielding device 40. The assembled LCD in the embodiment is shown in FIG. 6.

By applying the fixing structure of the present invention, a flat display such as an LCD can be assembled without rotation and additional fixtures or jigs. Further, the holders and the liquid crystal panel are fixed together, in which the side surfaces of the liquid crystal panel are screwless, thus preventing scraping the liquid crystal panel or impacting the LCD. Further, the present invention lowers the assembly time and manufacturing costs, which induces effective production of flat displays, such as LCDs.

In the above-mentioned embodiment, the first engaging portion 11 of the liquid crystal panel 10 is formed with positioning holes 12, and the first fixing portion 21 of each of the holders 20 is formed with positioning pins 22. However, the engagement of positioning holes and positioning pins of the present invention can be alternatively arranged; that is, the first engaging portion 11 can be formed with positioning pins, and the first fixing portion 21 can be formed with positioning holes.

Similarly, in the above-mentioned embodiment, the engaging hooks 24 are formed on the second engaging portion 23 of each of the holders 20, and the engaging holes 42 are formed on the second fixing portion 41 of the shielding device 40. However, the engaging hooks and the engaging holes can be alternatively arranged so that the engaging hooks are disposed on the second fixing portion 41 of the shielding device 40, and the engaging holes are disposed on the second engaging portion 23 of each of the holders 20.

Further, the holders 20 and the shielding device 40 are not limited to the schematic shapes in the drawings, and engagements of the present invention are not limited to the descriptive engagements in the embodiment.

Further, an LCD is introduced in the embodiment to describe the flat display of the present invention. However, the present invention is suited to application for any other types of flat displays, such as plasma display panel (PDP), and the like.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A fixing structure for a flat display, in which a first engaging portion is formed on both side surfaces of the flat display, the fixing structure comprising:

two holders respectively disposed on both of the side surfaces of the flat display, each of the holders formed with a first fixing portion corresponding to the first engaging portion, and a second engaging portion, the first fixing portion for detachably engaging each of the holders to the side surface of the flat display, wherein each second engaging portion is formed with at least one engaging hook, and each engaging hook comprises a notch toward a same direction parallel to a back surface of the flat display; and a shielding device formed with a second fixing portion corresponding to the second engaging portion, the second fixing portion for detachably engaging the shielding device to the holders, wherein the second fixing portion comprises a first surface, a second surface and a plurality of engaging holes passing though the first and second surfaces and corresponding to the engaging hooks;

wherein the shielding device is attached to the holders by moving the shielding device along a direction perpendicular to the back surface, the holders and the flat display are fixed together by moving the shielding device a predetermined distance along a direction parallel to the back surface of the flat display and separated by moving the shielding device the predetermined distance along an opposite direction parallel to the back surface, and the shielding device is separated from the holders by moving the shielding device along an opposite direction perpendicular to the back surface, and wherein when the holders and the shielding device are fixed together, the engaging hooks pass though the engaging holes from the first surface to protrude out of the second surface.

2. The fixing structure according to claim 1, wherein the first engaging portion is formed with a plurality of positioning holes.

3. The fixing structure according to claim 2, wherein the first fixing portion is formed with a plurality of positioning pins corresponding to the positioning holes.

4. The fixing structure according to claim 1, wherein the first engaging portion is formed with a plurality of positioning pins.

5. The fixing structure according to claim 4, wherein the first fixing portion is formed with a plurality of positioning holes corresponding to the positioning pins.

6. The fixing structure as claimed in claim 1, wherein the holders and the flat display are fixed together with application of the shielding device in a screwless way.

7. The fixing structure as claimed in claim 1, wherein each holder comprises a first portion and a second portion, the first portion and the second portion form an L-shaped structure, the first portion contacts the side surface of the flat display, and the second portion contacts the back surface of the flat display.

8. A liquid crystal display, comprising:

a liquid crystal panel having a front surface, a back surface opposed to the front surface, and two opposing side surfaces, each of the side surfaces being respectively formed with a first engaging portion;

a holding module having two holders respectively corresponding to each of the side surfaces of the liquid crystal panel, each of the holders being formed with a first fixing portion corresponding to the first engaging portion, and a second engaging portion, the first fixing portion for detachably engaging each of the holders to the corresponding side surface, wherein each second engaging portion is formed with at least one engaging hook, and each engaging hook comprises a notch toward a same direction parallel to the back surface; and a shielding device applied onto the back surface of the liquid crystal panel, the shielding device being formed with a second fixing portion corresponding to the second engaging portion, the second fixing portion for detachably engaging the shielding device to the holding module, wherein the second fixing portion comprises a first surface, a second surface and a plurality of engaging holes passing through the first and second surface and corresponding to the engaging hooks;

wherein the shielding device is attached to the holders of the holding module by moving the shielding device along a direction perpendicular to the back surface, the holders of the holding module and the liquid crystal panel are fixed together by moving the shielding device a predetermined distance along a direction parallel to the back surface and separated by moving the shielding device the predetermined distance along an opposite direction parallel to the back surface, and the shielding device is separated from the holders of the holding module by moving the shielding device along an opposite direction perpendicular to the back surface, and wherein when the holders and the shielding device are fixed together, the engaging hooks pass through the engaging holes from the first surface to protrude out of the second surface.

9. The liquid crystal display according to claim 8, wherein the first engaging portion is formed with a plurality of positioning holes.

10. The liquid crystal display according to claim 9, wherein the first fixing portion is formed with a plurality of positioning pins corresponding to the positioning holes.

11. The liquid crystal display according to claim 8, wherein the first engaging portion is formed with a plurality of positioning pins.

12. The liquid crystal display according to claim 11, wherein the first fixing portion is formed with a plurality of positioning holes corresponding to the positioning pins.

13. The liquid crystal display as claimed in claim 8, wherein the holding module and the liquid crystal panel are fixed together with application of the shielding device in a screwless way.

14. A fixing structure for or a flat panel display having a first engaging portion arranged on opposing side surfaces of the flat panel display, the fixing structure comprising:

first and second holder elements, each holder element having a first fixing portion engaging with the first engaging portion of the flat panel display for restraining movement of the flat panel display along a first direction, the first and second holder elements further having second engaging portions with at least one engaging hook, and each engaging hook comprises a notch toward a same direction parallel to a back surface of the flat panel display; and a shielding element having second fixing portions comprising a first surface, a second surface and a plurality of engaging holes for engaging with the second engaging portions of the first and second holder elements for restraining movement of the flat panel display along a second direction, the second direction being orthogonal to the first direction and parallel to the back surface;

wherein the shielding element is attached to the first and second holder elements by moving the shielding element along a direction perpendicular to the back surface so that the engaging hook passes through the engaging hole, the first and second holder elements and the flat panel display are fixed together by moving the shielding element a predetermined distance along a direction parallel to the back surface and separated by moving the shielding element the predetermined distance along an opposite direction parallel to the back surface, and the shielding element is separated from the first and second holder elements by moving the shielding element along an opposite direction perpendicular to the back surface so that the engaging hook separates from the engaging hole, and wherein when the holders and the shielding device are fixed together, the engaging hooks pass through the engaging holes from the first surface to protrude out of the second surface.

15. The fixing structure as claimed in claim 14, wherein the first and second holder elements and the flat panel display are fixed together with application of the shielding element in a screwless way.

16. A fixing structure for a flat panel display having a first engaging element arranged on opposing side surfaces of the flat panel display, the fixing structure comprising:

first and second holder elements, each holder element engaging one of said opposing side surfaces of the flat panel display and having a first fixing portion mating with the first engaging portion of the flat panel display for restraining movement of the flat panel display along a first direction parallel to said opposing side surfaces, the first and second holder elements further having a second engaging portion, wherein each second engaging portion is formed with at least one engaging hook, and each engaging hook comprises a notch toward a same direction parallel to a back surface of the flat panel display; and a shielding element having second fixing portions for mating with the second engaging portions of the first and second holder elements for restraining movement of the flat panel display along a second direction, the second direction being orthogonal to the first direction, wherein the second fixing portion comprises a first surface, a second surface and a plurality of engaging holes passing through the first and second surfaces and corresponding to the engaging hooks;

wherein the shielding element is attached to the first and second holder elements by moving the shielding element along a direction perpendicular to the back surface, the first and second holder elements and the flat panel display are fixed together by moving the shielding element a predetermined distance along a direction parallel to the back surface and separated by moving the shielding element the predetermined distance along an opposite direction parallel to the back surface, and the shielding element is separated from the first and second holder elements by moving the shielding element along an opposite direction perpendicular to the back surface, and wherein when the holders and the shielding device are fixed together, the engaging hooks pass through the engaging holes from the first surface to protrude out of the second surface.

17. The fixing structure of claim 16 wherein the first engaging element arranged on the opposing side surfaces of the flat panel display comprises a pair of notches formed along each of the opposing side surfaces of the flat panel display and wherein the first fixing portion of the first and second holder elements each comprises a pair of protuberances for mating with the pair of notches formed along each of the opposing side surfaces of the flat panel display for restraining movement of the flat panel display along said first direction.

18. The fixing structure as claimed in claim 16, wherein the first and second holder elements and the flat panel display are fixed together with application of the shielding element in a screwless way.

* * * * *